United States Patent [19]

Dennis et al.

[11] Patent Number: 4,546,836
[45] Date of Patent: Oct. 15, 1985

[54] DOWNHOLE MOTOR FLUID FLOW RESTRICTOR

[75] Inventors: James G. Dennis, Pottsboro; Kenneth W. Bramlett, Arlington; G. C. Jackson, Jr., Dallas, all of Tex.

[73] Assignee: Dresser Industries, Inc., Dallas, Tex.

[21] Appl. No.: 545,794

[22] Filed: Oct. 26, 1983

[51] Int. Cl.⁴ ............................................. E21B 4/02
[52] U.S. Cl. ..................................... 175/107; 175/324
[58] Field of Search ................................ 175/107, 324

[56] References Cited

U.S. PATENT DOCUMENTS

| | | | |
|---|---|---|---|
| 2,908,534 | 10/1959 | Rietsch | 308/162 |
| 3,194,325 | 7/1965 | Gianelloni | 175/107 |
| 3,456,746 | 7/1969 | Garrison et al. | 175/320 |
| 3,858,668 | 1/1975 | Bell | 175/107 |
| 3,879,094 | 4/1975 | Tschirky et al. | 308/230 |
| 3,936,247 | 2/1976 | Tschirky et al. | 418/48 |
| 3,982,859 | 9/1976 | Tschirky et al. | 418/48 |
| 4,029,368 | 6/1977 | Tschirky et al. | 308/8.2 |

Primary Examiner—Stephen J. Novosad
Assistant Examiner—M. Goodwin
Attorney, Agent, or Firm—Fred A. Winans

[57] ABSTRACT

A downhole drilling motor located near the end of a rotary drill string is powered by the drilling fluid for driving a rotary drill bit for the drilling of an oil or gas well or the like. Substantially all of the drilling fluid that exits the power producing section is channeled toward the nozzles of the drill bit with a small portion being diverted through the bearings of the motor. A series of elastomer flow restrictor elements, each responding to increased fluid pressure by reducing the flow area therethrough, controls the fluid flow through the bearings to within a narrow range of flow rates.

13 Claims, 8 Drawing Figures

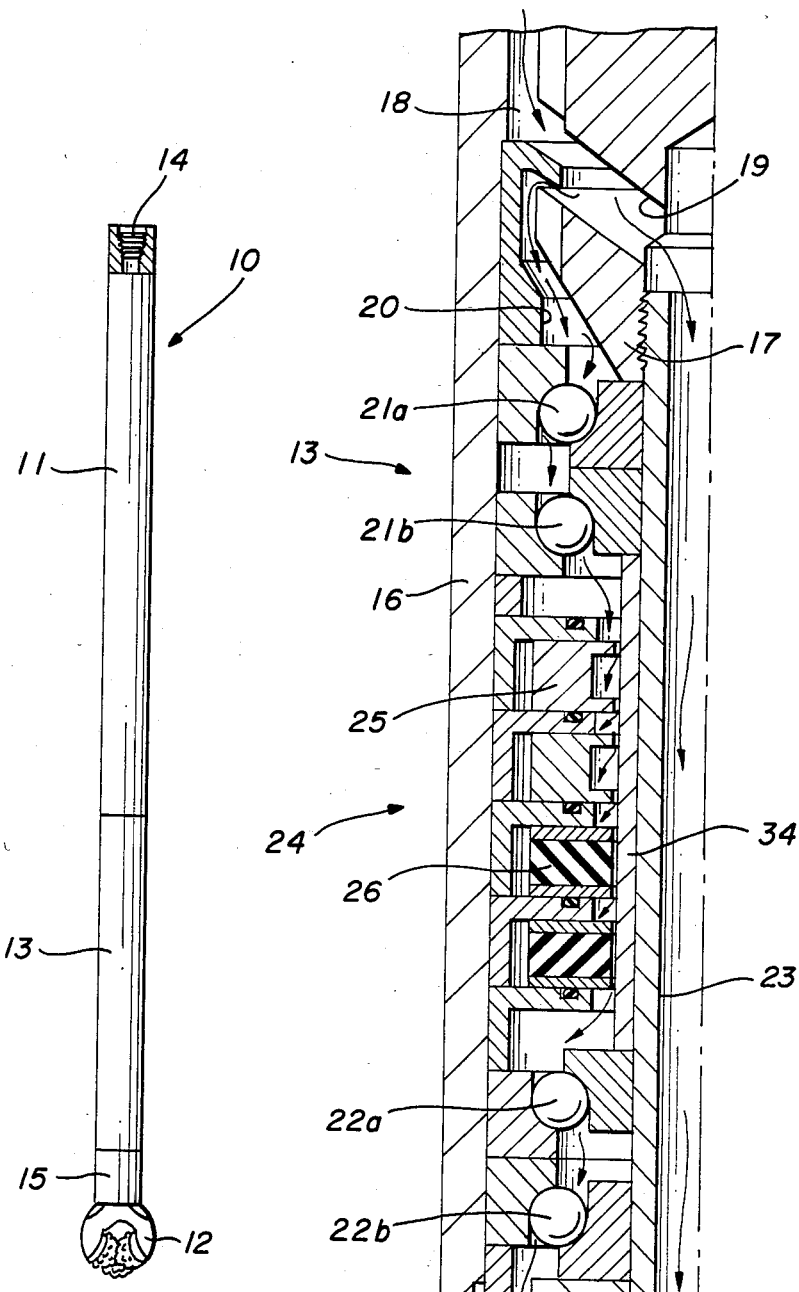

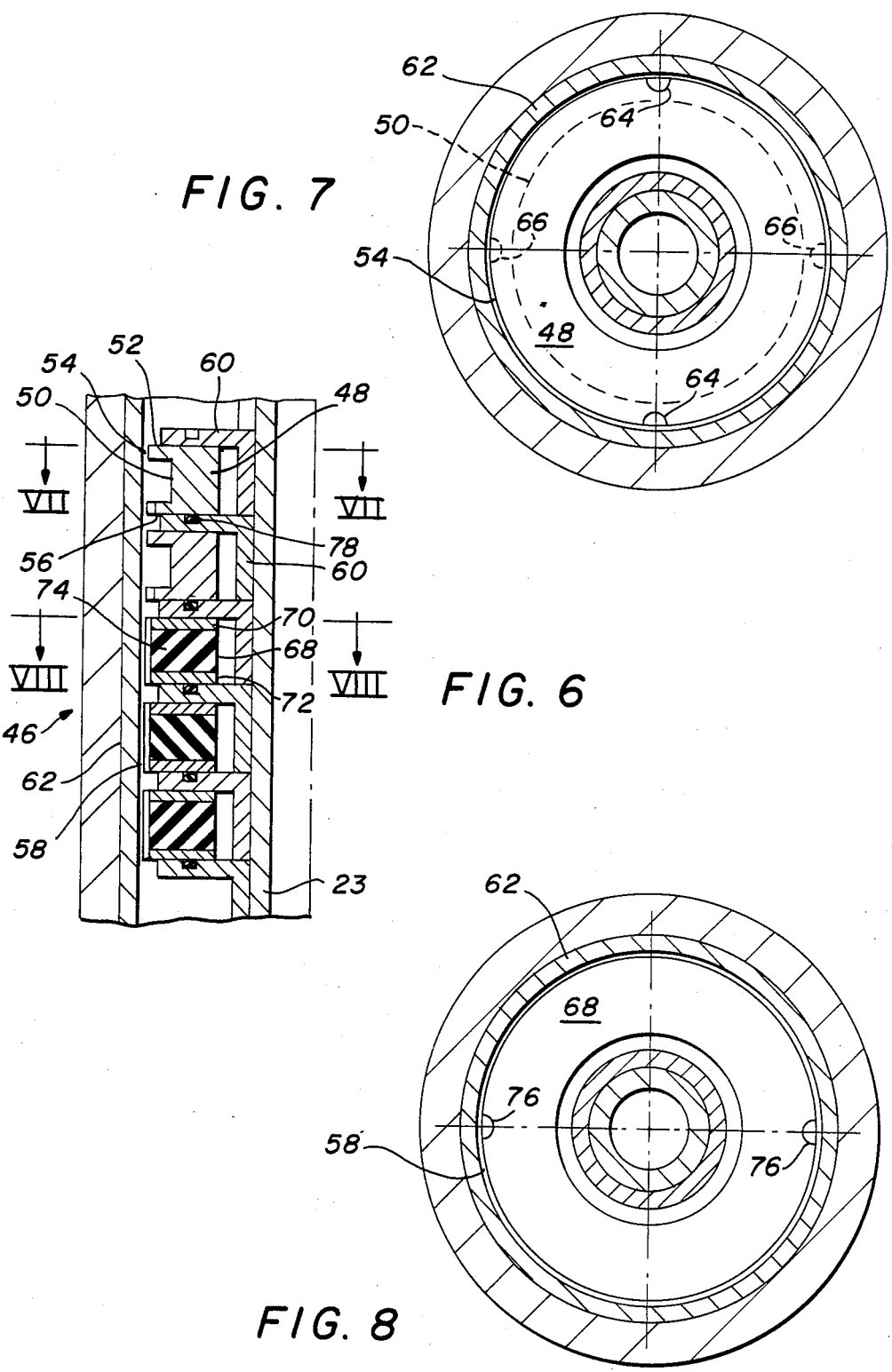

DOWNHOLE MOTOR FLUID FLOW RESTRICTOR

TECHNICAL FIELD

The present invention relates in general to the art of earth boring and, more particularly, to a downhole drilling motor that is carried near the end of a rotary drill string and actuated by the down-flowing drilling fluid; thereby, driving a rotary drill bit for the drilling of oil and gas wells and the like.

BACKGROUND OF THE INVENTION

The conventional U.S. system of oil well drilling involves the rotation of a string of drill pipe with a rotary drill bit located at the end of the drill string. Power from a motor or engine at the surface is transmitted to the bit by rotating the entire drill string. During drilling, a drilling fluid generally called drilling mud is pumped downward through the inside of the drill string and out through ports in the drill bit. The fluid then carries the material loosened by the drill bit back to the surface through the annulus between the drill pipe and the borehole. Many and varied circumstances make it desirable to drive the drill bit at speeds independent of the rotation (or stationary condition) of the drill string. A downhole motor is usually attached at or near the bottom of the drill string to accomplish this. The motor may be electric or hydraulic. If hydraulic, it may be either a turbine or a positive displacement vane or Moineau motor. All motors must have these essential elements: a power section with a stator and a rotor which produce torque and rotation between them; thrust and radial bearing supports between stationary and rotating members; a flow path for the drilling fluid from the drill string to the drill bit which path may be through the power section, and through or partially through the bearing supports. The focus of this invention is that portion of the flow path through the bearing supports adjacent to the hollow drive shaft connected to the drill bit.

Since the drilling fluid and its contaminants are hostile to the function and life of the bearings, elimination from or control of the drilling fluid through the bearings is significant to motor function, life, and overall drilling costs. Seals can eliminate the drilling fluid from the bearings and permit lubricating oil to extend bearing life. But in such application, pressure equalization means and a volume reservoir complicate design, create functional problems, which increase initial and maintenance costs. Also, effective seals are notorious for creating torque losses and expensive repairs usually result when failures occur. Control of the fluid flow through the bearings is less expensive to maintain, less subject to catastrophic failure and permits the selection of down thrust piston effect areas to more nearly balance the hydraulic down thrust with the anticipated bit loads, thereby minimizing the bearing loads which will extend bearing life. (i.e. A downhole motor is subjected to vertical loading on the thrust bearings which varies from high downward thrusts, due to the pressure of the circulating fluid on the internal working parts, to a very high upward thrust when the drill string weight on the bit exceeds the hydraulic down thrust on the shaft.)

It will be appreciated that structure to extend the operating life of the motor is extremely important in that premature failure of the motor while downhole requires expensive down time on the drill rig.

DESCRIPTION OF PRIOR ART

In the unsealed bearing support packages, prior approaches to controlling the fluid flow was initially with the use of grooved marine radial bearings functioning as both a restrictor to the flow through the thrust bearings and as the radial bearing. The grooved marine radial bearing was a poor restrictor in that it permitted only low pressure to exist across the bit. As a radial bearing, it had a short life due to high wear rate in the drilling fluid environment. With radial wear and movement, the thrust bearing life was shortened and drill bit life and effectiveness was reduced. The addition of rolling element radial bearings to the above configuration increased costs with very little improvement in radial bearing life. The further addition of hardened friction or plain radial bearings made them prone to seizing or plugging with mud solids. Also, high wear rates made them ineffective. Short effective restrictor life and the limitation of the pressure drop across the drill bit to low values and poor hydraulics prompted the seeking of longer life, higher pressure restrictor configuration that was not a torque thief.

SUMMARY OF THE INVENTION

A downhole drilling motor is located near the end of a rotary drill string and operated by the circulating drilling fluid for driving a rotary drill bit. A portion of the drilling fluid is diverted through the bearings of the downhole motor to provide cooling and lubrication for the bearings. A restrictor or series of restrictors limits the flow rate of fluid through the bearings. As one or more of the functioning restrictor elements wear, another or additional restrictor elements effectively controls the flow. One of the objects of this invention is to provide a restrictor system which will provide generally a nearly constant volume of fluid through the bearings of the downhole motor, regardless of the variations in flow rates and pressures of the drilling fluid.

Yet another object is to provide a restrictor system to limit the fluid diverted for bearing lubrication and maintain an adequate volume of fluid and fluid velocity for bottom hole cleaning.

The restrictor system of the present invention controls the flow rate of the drilling fluid through the bearings, compensating for the variations in the flow rate and pressures used through the nozzle restrictions in the drill bit. The objectives of the invention are accomplished by fixed area restrictors of metal or suitable material placed upstream of the variable area restrictors. The variable area restrictors comprise an elastomeric ring molded between an upper and lower metal ring, sized to create an annulus between the rings and the adjacent wear sleeve. As the pressure above the restrictor forces the upper metal ring downward, the elastomeric ring is urged into the annulus formed by the elastomeric ring and the opposing restrictor wear sleeve thus further reducing the cross-section flow area until an equilibrium of restrictor elements produces the necessary total restriction to equal the jet pressure drop at some flow rate. Longitudinal grooves are formed in the face of the restrictor, providing a sufficiently large path to prevent debris from causing a complete shutoff of the fluid and provide a constant flow of fluid to flush wear debris and to keep the bearings lubricated with the drilling fluid. Also, the size and number of vertical grooves determine the flow rate that will be achieved at equilibrium. The above and other features and advantages of the present invention will become apparent from a consideration of the following detailed description of the invention when taken in conjunction with the accompanying drawings.

BRIEF DESCRIPTION OF THE DRAWINGS

FIG. 1 is a longitudinal view illustrating a downhole drilling motor.

FIG. 2 is an illustration of the bearing and fluid restrictor sections of a downhole drilling motor constructed in accordance with the present invention.

FIG. 6 illustrates a sectional view of an alternate restrictor system with the fluid flowing past the exterior of the restrictor elements.

FIG. 7 is a cross-section view as seen looking along the line VII—VII of FIG. 6.

FIG. 8 is a cross-section view as seen looking along the line VIII—VIII of FIG. 6.

DETAILED DESCRIPTION OF THE PREFERRED EMBODIMENTS

Figures 3, 4, 5:
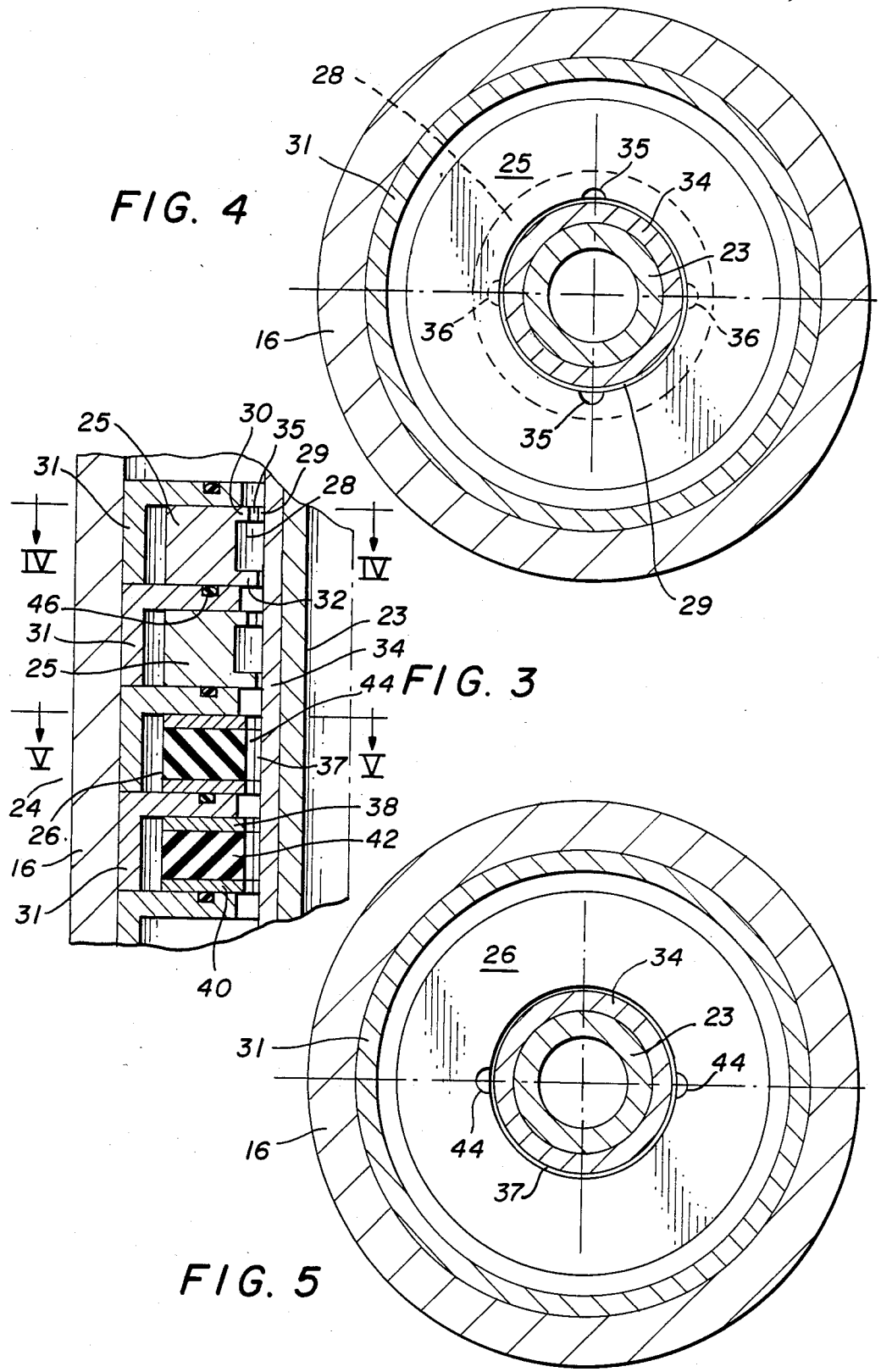
FIG. 3 illustrates a sectional view of the restrictor system.
FIG. 4 is a cross-section view as seen looking along lines IV—IV of FIG. 3.
FIG. 5 is a cross-section view as seen looking along the line V—V of FIG. 3.

Referring now to the drawings and to FIG. 1 in particular, a downhole motor is illustrated and generally designated by the reference number 10. The downhole motor 10 is provided with a non-sealed bearing section 13 and power section 11. The power section 11 may be any suitable type of fluid power device. For example, the power section 11 may be a hydraulic turbine or a Moineau pump running backward as the power source as more clearly shown and described in U.S. Pat. No. 2,898,087 to W. Clark, patented Aug. 4, 1959. The power section 11 is connected to the lower end of a drill string of tubular members (not shown) extending to the surface. The threaded connection 14 allows the power section 11 to be connected to the drill string. The drilling fluid is circulated down through the drill string and through power section 11 and bearing section 13. The lower end of the bearing section 13 is connected to a rotating bit sub 15 which carries the drill bit 12.

Referring to FIG. 2, it is seen that the fluid flow leaves the power section through passage 18 defined between bearing housing 16 and rotative element or drive nut 17 and then is divided at passage 19 and diverter passage 20. The most desirable condition is for the majority of the total flow to pass through central passage 19 and to be discharged through the bit to clean the bottom of the hole with a necessary smaller amount diverted through diverter passage 20 to cool the bearings, to provide some lubrication to the bearings, and to flush wear particles from the bearing section. Solids in the drilling fluid may be diverted from the fluid passing through the bearing by using a solids diverter as described in U.S. Pat. No. 4,260,031 to G. C. Jackson, Jr. issued Apr. 7, 1981 with the same assignee. In the application of a specific size of downhole motor, the actual total fluid flow rate through the motor will vary with the capability of the hydraulic power supply, the internal diameter of the drill string members and their length, the restrictions used in the drilling bit in conjunction with the restriction of the bearing section, the fluid weight and characteristics, and the hole size.

Still referring to the sectional view of FIG. 2, it is seen the drive nut 17 rotates within the bearing housing 16. Upper bearings 21a and 21b and lower bearings 22a and 22b promote rotation of the drive nut 17 and cylindrical bit drive shaft 23. The flow rate of the diverted cooling and lubricating drilling fluid flowing through the bearings 21a and 21b and 22a and 22b is controlled by a restrictor system 24 having both a fixed area restrictor 25 and a series of variable area constant flow restrictors 26 disposed in the annular area between the bearing housing 16 and the bit drive shaft 23.

Now referring to FIG. 3, an enlarged sectional view of a portion of the restrictor system 24 is shown. The fixed area restrictors 25 are donut-shaped having an internal radial annular groove 28 forming a plenum defined by an upper internal lip 30 and a lower internal lip 32. Lips 30 and 32 extend closely to but spaced from a wear sleeve 34 surrounding the drive shaft 23 to form therebetween an annular fixed area restricted flow path 29. Restrictor support pedestals 31 having an annular flange extending towards, but spaced from the wear sleeve 34, separates and supports the restrictors 25.

The fixed area restricted flow path 29 between the internal lips 30, 32 and the wear sleeve cause the absolute fluid pressure below the restrictors 25 to be lower than the absolute fluid pressure above the restrictors 25.

Referring now to FIG. 4, it is seen there are two notches 35 located 180 degrees apart in upper lip 30 of each restrictor 25, similarly two notches 36 are located 180 degrees apart in the lower lip 32, and oriented 90 degrees from notches 35. The notches are a part of the fixed restrictor flow path and assure that some fluid will flow through the fixed area restrictor system and cool the bearings should the small radial clearance 29 between the wear sleeve 34 and the lips 30 and 32 of the restrictors become clogged with debris.

To reduce wear on the constant flow restrictors 26, one or more fixed restrictors 25 are placed upstream of the constant flow restrictors 26. Also, it should be noted, the restrictors 25 and 26 can be located above the upper bearings 21 in the bearing section 13, or below the lower bearings 22, but the preferred position is between these two bearings 21, 22 as misalignment between the rotating shaft and stationary housing will be at a minimum.

Referring again to FIG. 3, each annular variable area constant flow restrictor 26 is sandwiched between an upper retainer plate 38 and lower retainer plate 40 bonded to the constant flow annular body 42 which is made from an elastomer-like material. The retainer plates 38 and 40 are preferably made from steel, or other wear resistant material; and it has been found, a 90 durometer elastomer performs well for the body 42.

Further, it should be noted that bonding the elastomer body 42 to the upper retainer plate 38 controls the deformation (i.e. radial bulge) of the elastomer under pressure and prevents it from functioning as a lip seal with high lateral force against the wear sleeve 34 and causing a high torque loss. Similarly, bonding the elastomer body 42 to the lower plate 40 controls deformation of the elastomer and prevents it from becoming extruded to between the retainer plate 40 and wear sleeve 34 and functioning as an "O" ring and causing a high torque loss. Thus, it is apparent the non-deformable wear plates bonded to the elastomer body 42 aid in maintaining the restrictors in a low torque loss configuration.

With reference to FIG. 5, there is seen a variable area flow restrictor 26 consisting of retainer plates 38 and 40 on either side of elastomer body 42 with the internal diameters of each close to, but spaced from, the outside diameter of the wear sleeve 34, forming a small annular radial clearance 37 to restrict the flow of fluid between the restrictor 26 and the wear sleeve 34. Each element of the constant flow restrictor 26 has two notches 44 axially along the internal diameter to permit some flow of fluid through the bearing system should the small radial clearance 37 be effectively closed off by the pressure drop across restrictor 26 urging or deforming elastomer body 42 to press against sleeve 34.

With reference to FIG. 3, the function of the constant flow restrictor 26 is as follows. The absolute pressure of the fluid decreases as the fluid passes through the notches 44 and the small radial clearance 37 between the internal diameter of the restrictor 26 and the wear sleeve 34. The fluid pressure downward against the top of upper retainer plate 38 is higher than the fluid pressure below the lower retainer plate 40. Annular seals 46 in grooves on the radial flange of restrictor support pedestal elements 31 in contact with the opposed face of the above restrictor to prevent fluid from flowing between the restrictors 25 and 26 and elements 31. The higher pressure downward against the upper retainer plate 38 compresses the elastomer body 42 against the lower retainer plate 40 and the seal 46 causing the deformable body 42 to distort and bulge both radially outwardly and inwardly. The inward bulge toward the wear sleeve 34 reduces the clearance 37 between the retainer body 42 and the wear sleeve 34, and also reduces the area of the notch 44. The greater the fluid pressure, the greater the deformation resulting in a greater reduction in area of the clearance and the notch 44 thereby providing approximately the same fluid flow through the restrictor in response to the increased fluid pressure.

Referring now to FIG. 6, a sectional view of an alternate restrictor system 47 is shown. Restrictor system 47 has a fixed area restrictor 48 which is donut-shaped, having an external radial groove 50 forming an external plenum and defining an upper external lip 52, a lower external lip 56, each terminating in an outer face slightly spaced from an external wear sleeve 62 to define an annular flow path 54. An external restrictor support pedestal 60 separates and supports the restrictors 48. The restricted flow path 54 causes a pressure drop as the fluid flow passes between the restrictor 48 and the internal wear sleeve 62.

The absolute fluid pressure below the external restrictor 48 is lower than the absolute fluid pressure above the external restrictor 48. The higher pressure above restrictor 48 forces the restrictor against the support pedestal 60 between adjacent restrictors and seal 78 to prevent fluid from flowing between restrictors 48 and pedestal 60.

Referring now to FIG. 7, it is seen there are two axial notches 64 located 180 degrees apart in the outer surface of the upper lip 52 and two notches 66 located 180 degrees apart in the lower lip 56 and oriented 90 degrees from the notches 64. The notches 64, 66 assure that some fluid will flow through the restrictor system if the small radial clearance 54 between the external wear sleeve 62 and the faces 54 and 56 of the restrictor become clogged with debris.

Referring again to FIG. 6, each annular variable area constant flow external restrictor 68 is sandwiched between an upper external retainer plate 70 and a lower external retainer plate 72 both bonded to body 74, preferably made from an elastomer-like material. The retainer plates 70 and 72 are preferably made from steel, or other wear resistant material. A 90 durometer elastomer has been found to perform well for the body 74.

With reference to FIG. 8, it is seen that a small radial clearance 58 restricts the flow of fluid between the external restrictor 68 and the external wear sleeve 62. The external constant flow restrictor 68 has two axial notches 76 along the external diameter to permit some flow of fluid through the restrictors to the bearing system should the radial clearance 58 between the wear sleeve 62 and the external restrictor 68 be effectively closed off by the pressure drop across the restrictor 68 urging or deforming the restrictor body 74 against sleeve 62.

Referring again to FIG. 6, the function of the variable area constant flow restrictor 68 is as follows. The absolute fluid pressure decreases as the fluid passes through the notches 76 and the small radial clearance 58 between the external diameter of the restrictor 68 and the wear sleeve 62. The fluid pressure downward against the top of upper retainer plate 70 is higher than the fluid pressure below the lower retainer plate 72. Annular seals 78 in grooves on the radial flange of restrictor support pedestal elements 60 in contact with the upper face of the opposed restrictor prevent fluid from flowing between the restrictors 48 and 68 and elements 60. The higher pressure downward against the upper retainer plate 70 compresses the elastomer body 74 against the lower retainer plate 72 and the seal 78 causing the restrictor body 74 to distort and bulge both inwardly and outwardly toward the wear sleeve 62, reducing the clearance 58 between the restrictor body 74 and the wear sleeve 62, and also reducing the area of the notch 76. The greater the pressure, the greater the deformation resulting in a greater reduction in area of the clearance and the notch 76 thereby providing approximately the same fluid flow regardless of the fluid pressure.

It should be noted in both embodiments that the pedestal elements 31 or 60 are positively located in the annular bearing housing by abutting relationship with either the outer housing 16 or the inner drive shaft 23 respectively but not extending radially too close to the opposed cylindrical member, i.e. wear sleeve. However, the restrictor members 25, 26, 48, 68 are seen to be free-floating laterally and not positively located (i.e. ideally they would be concentric but there is no positive structure to limit their movement to a non-concentric position) thereby adapting them to accept relative lateral displacement between the bearing housing and the bit drive shaft without producing high frictional rubbing engagement and also limiting their lateral loading. This prevents the restrictors from premature wear and also from creating high torque losses.

With restrictor system 24 shown in FIG. 2, a pressure differential is realized as the fluid flows from the top of the restrictor to the bottom. This pressure differential acts downward on the effective piston area of the rotating member sleeve 34 at its outer diameter producing a significant downward force. The pressure differential across the power section acts on the effective piston area of the projected cross-section area of the rotor producing another significant downward force. Both downward forces combine and are supported through bearings 21b and 22a by the bearing housing 16 and the drill string. Bearings 21a and 22b are carrying no thrust load, only radial load. As the drill string is lowered and weight is applied to the bit, hydraulic bearing loads on 21b and 22a are reduced and become zero when upward bit load and downward hydraulic loads become equal in magnitude. When bit loads are further increased, bearings 21a and 22b support only the difference between the hydraulic downward forces and the total bit load.

The alternate restrictor system 47 shown in FIG. 6 has a larger effective piston area. The realized pressure differential from the top of the restrictor to the bottom acts downward on the effective piston area of the rotating restrictor 68 at its outer diameter producing a greater significant downward force. This force and the downward force of the power section are supported by the same bearings and in the same manner as previously described for restrictor system 24, but the downward hydraulic loads are much greater with system 47 due to the greater effective area.

It can be seen that we have solved the problem of maintaining a desired volume of fluid flow through the bearings for lubricating, cooling and removing wear debris minimizing and resulting in longer bearing life.

Also to be noted is the use of fixed restrictors to reduce the wear on the constant flow restrictor, ensuring the constant flow restrictor of long and effective life.

Further the restrictor system of either embodiment does not have seals that would cause torque loss due to seal friction, nor do they themselves cause such torque loss.

We claim:

1. A fluid flow restrictor system for limiting the fluid flow through an unsealed bearing housing of a drilling tool wherein the bearing housing is defined between an outer cylindrical member and a relatively rotatable inner cylindrical member, and bearing means disposed in said housing for rotatably supporting said cylindrical members and lubricated and flushed by said fluid flow therethrough, said system comprising:

restrictor means disposed in said bearing housing between said members to provide no load bearing support for said members and defining a variable area flow path for said fluid flow through said housing, said means responsive to increases in fluid pressure by decreasing said flow path area to maintain said fluid flow rate within a narrow range regardless of said fluid pressure, said restrictor means comprising:

a deformable member configured to define a fluid passage in flow communication with said fluid and said system further includes:

means for supporting said restrictor means against axial displacement due to increases in fluid pressure; and, means for protecting the upstream surface of said deformable member from direct contact with high pressure abrasive drilling fluid.

2. Structure according to claim 1 wherein said deformable member is defined by an annular elastomer ring having an inner diametral surface at a first diameter generally adjacent said internal cylindrical member and an outer diametral surface at a second diameter generally adjacent said external cylindrical member and wherein one of said diametral surfaces is radially spaced from the respective adjacent cylindrical member to define a fluid flow path therebetween.

3. Structure according to claim 2 wherein said means for protecting the upstream surface of said deformable member includes:

a non-deformable retainer disc bonded to said upstream surface and defining an inner diameter and an outer diameter and wherein;

said one of said diametral surfaces of said deformable member is coterminous with the respective diametral surface of said disc.

4. Structure according to claim 3 wherein said means for protecting the upstream surface of said deformable member further includes a non-deformable ring supported in said housing upstream of said deformable ring and having means thereon defining a restricted constant area flow path for said drilling fluid to provide lower pressure fluid exiting said constant area flow path.

5. Structure according to claim 4 wherein said support means comprises a pedestal member having a flange extending radially from an annular axial leg in engagement with one of said relatively rotatable cylindrical members, and said deformable member and non-deformable discs are supported on said radial flange of adjacent support means and in generally sealed engagement therewith and wherein the inner diametral surface and the outer diametral surface of each respective member and disc are sized to provide an annular space between said diametral surface and the adjacent cylindrical surface whereby said deformable member and said discs are free to move laterally on said flange to accommodate lateral movement of said relative rotating members without causing torque loss.

6. Structure according to claim 5 wherein said restrictor system comprises a plurality of said non-deformable members in series flow communication upstream of a plurality of deformable rings in series flow communication.

7. Structure according to claim 3 wherein said restrictor means further includes a second non-deformable retainer disc bonded to the downstream face of said deformable member and having a diametral surface generally coterminous with said one diametral surface of said deformable member whereby said non-deformable discs bonded to said deformable member restrict the radial deformation of said deformable member to prevent high torue loss engagement between the deformable member and adjacent rotating member.

8. An improved downhole drilling motor including a cylindrical external member; a relatively rotatable cylindrical internal member disposed therein and defining therebetween a vertically oriented annular chamber; bearing structure in said chamber for supporting said members for relative rotation; said members also defining a first drilling fluid passage for delivering drilling fluid under normal operating pressure through said motor; means for directing a major portion of the fluid into and through said internal member and a lesser portion into and through said chamber upstream of said bearing structure; and wherein said improvement comprises:

a fluid flow restrictor system disposed downstream of said fluid directing means, and mounted between said member to provide no load bearing support said said members, said system limiting the rate of fluid flow through said chamber and bearing structure, and including fluid restrictor means defining a variable area flow path responsive to increases in fluid pressure by decreases in the area of said variable area flow path to maintain said fluid flow rate within a narrow range regardless of said normal operating fluid pressure, said restrictor means comprising:

a deformable member defined by an annular elastomer ring disposed in said bearing chamber and having an inner surface at a first diameter generally adjacent said internal cylindrical member and an outer surface at a second diameter generally adjacent said external cylindrical member and wherein one of said inner or outer surfaces is radially spaced from the respective adjacent cylindrical surface to define a fluid passage between said ring and said adjacent member and in flow communication with said diverted drilling fluid and supported within said chamber against axial displacement whereby fluid pressure on said member deforms said member and ultimately said passage to alter the flow path area defined thereby; and a retainer disc secured to the upstream face of said deformable member and having an edge generally coterminous with said radially spaced surface to likewise define a fluid passage said disc also serving as a wear resistant element protecting said ring from the abrasive drilling fluid.

9. Structure according to claim 8 wherein said one of said surfaces of said ring spaced from said adjacent cylindrical surface and said coterminous edge of said retainer disc include axially aligned notches extending axially therethrough to define a flow path capable of remaining open for fluid flow as said ring is deformed.

10. Structure according to claim 8 wherein said restrictor means further includes a retainer disc secured to the downstream face of said deformable member and having an edge coterminous with said radially spaced surface and wherein both said upstream and downstream discs are bonded to the respective face of said member to prevent the radial deformation of said member at each bonded interface.

11. Structure according to claim 10 wherein said restrictor means includes a non-deformable ring supported in said housing upstream of said deformable ring and axially spaced therefrom and having means defining a constant area flow path therethrough to provide lower pressure fluid exiting said non-deformable ring.

12. Structure according to claim 11 wherein said non-deformable ring and said deformable ring are supported in said housing on annular pedestal members having a radial flange with said rings free to move laterally on said flange to accommodate lateral movement of said relative rotating members.

13. Structure according to claim 12 wherein said restrictor system comprises a plurality of said non-deformable rings in series flow communication upstream of a plurality of deformable restrictor rings in series flow communication.

* * * * *